United States Patent [19]
Taubin et al.

[11] Patent Number: 6,009,435
[45] Date of Patent: Dec. 28, 1999

[54] PROGRESSIVE COMPRESSION OF CLUSTERED MULTI-RESOLUTION POLYGONAL MODELS

[75] Inventors: Gabriel Taubin, Hartsdale; William Pettit Horn, Scarsdale; Paul Borrel, Cortlandt Manor, all of N.Y.

[73] Assignee: International Business Machines Corporation, Armonk, N.Y.

[21] Appl. No.: 08/976,247

[22] Filed: Nov. 21, 1997

[51] Int. Cl.⁶ .................................................. G06F 15/00
[52] U.S. Cl. ...................... 707/101; 345/420; 345/423; 345/428
[58] Field of Search ............................ 707/101; 345/440, 345/423, 443, 420, 425, 428

[56] References Cited

U.S. PATENT DOCUMENTS

| | | | |
|---|---|---|---|
| 5,363,107 | 11/1994 | Gertz et al. ................................. | 342/26 |
| 5,448,686 | 9/1995 | Borrel ..................................... | 345/420 |
| 5,506,947 | 4/1996 | Taubin .................................... | 345/433 |
| 5,748,865 | 5/1998 | Yamamoto et al. ...................... | 345/423 |
| 5,825,369 | 10/1998 | Rossignac et al. ...................... | 345/440 |
| 5,872,572 | 2/1999 | Rossignac ............................... | 345/428 |
| 5,886,702 | 3/1999 | Migdale et al. ......................... | 345/423 |

FOREIGN PATENT DOCUMENTS

757333A2  8/1995  European Pat. Off. .

OTHER PUBLICATIONS

Hugues, H., "Progressive meshes", Proceedings of the ACM SIGGRAPH conference on computer graphics, Abstract Only, Aug. 1996.

De Floriani, et al., "Hierarchical triangulation for multiresolution surface description", ACM transactions on Graphics, vol. 4, No. 4, Abstract Only, Oct. 1995.

J. D. Foley, A. van Dam, S. K. Feiner and J. F. Hughes, Computer Graphics Principles and Practice, Addison–Wesley, 1990, pp. 471–477.

R. E. Tarjan, Data Structures and Network Algorithms, Society for Industrial and Applied Mathematics, Philadelphia, PA, 1983, pp. 14–21.

P. Heckbert, Multiresolution Surface Modeling, Course Notes for SIGGRAPH '97, Los Angeles, Ca., Aug. 5, 1997, pp. 1–4.

M. Deering, Geometry Compression, Sun Microsystems, ACM–O–89791–701 4/95/008, pp. 13–20.

H. Hoppe, "Progressive Meshes", Microsoft Research, ACM–0–89791–746–4/96/008, pp. 99–108.

J. Popovic and H. Hoppe, "Progressive Simplicial Complexes", Carnegie Mellon U. and Microsoft Research, ACM–0–89791–896–7/97/008, pp. 217–224.

*Primary Examiner*—Jean R. Homere
*Attorney, Agent, or Firm*—Louis J. Percello

[57] ABSTRACT

A computer system progressively stores and transmits compressed clustered multi-resolution polygonal models. The computer uses a data structure that represents a clustered multi-resolution polygonal model in n-dimensional space. The data structure has a connectivity record which encodes the connectivity information of the highest level of detail. The data structure also has a clustering record which encodes how the vertices of each level of detal are clustered to obtain the vertices of the next lower level of detail. The clustering record is organized in decreasing order of level of detail. The data structure also has a data record with information describing the vertex positions of the levels of detail, and optionally the corresponding properties. The fields of the data record are organized in increasing order of level of detail. The system also includes ways for creating this data structure from a clustered multi-resolution polygonal model, transmitting this information between computers, and compressing and decompressing this transmitted information.

17 Claims, 14 Drawing Sheets

PROGRESSIVE COMPRESSION OF CLUSTERED MULTI-RESOLUTION POLYGONAL MODELS

FIELD OF THE INVENTION

This invention relates to the field of computer graphics. More specifically, the invention relates to the representation of clustered multi-resolution polygonal models in compressed form for progressive transmission and compact storage.

BACKGROUND OF THE INVENTION

Although modeling systems in Mechanical Computer Aided Design and in animation are expanding their geometric domain to free form surfaces, polygonal models remain the primary 3D representation used in the manufacturing, architectural, Geographic Information Systems, geoscience, and entertainment industries. Polygonal models are particularly effective for hardware assisted rendering, which is important for video-games, virtual reality, fly-through, and electronic mock-up applications involving complex Computer Aided Design models.

A polygonal model is defined by the position of its vertices (geometry), which are n-dimensional vectors, by the association between each face and its sustaining vertices (connectivity), and/or by colors, normals, and texture coordinates (properties), which do not affect the 3D geometry, but influences the way it is shaded.

In the present disclosure we will also refer to a polygonal model as a "single-resolution polygonal model".

Single-resolution polygonal models are described in detail in U.S. Pat. No. 5,825,369 "Compression of Simple Geometric Models Using Spanning Trees", Ser. No. 08/688,572 filed Jul. 30, 1996, by J. Rossignac and G. Taubin, and in U.S. patent application "Compression of Geometric Models Using Spanning Trees", Ser. No. 08/685,422 filed Jul. 30, 1996, by J. Rossignac and G. Taubin, which are here incorporated by reference in its entirety.

When the number of vertices and faces of a polygonal model is very large, the graphics rendering hardware may not be able to achieve frame rates high enough for interactive applications. Multi-resolution polygonal models are used in the prior art to solve this problem.

A multi-resolution polygonal model is a sequence of polygonal models, where each element of the sequence, called a "level of detail", or just a "level", has more vertices and faces than the previous level. The first element of the sequence is called the "lowest resolution level", and the last element of the sequence is called the "highest resolution level".

Multi-resolution polygonal models solve the problem of interacting with very large polygonal models by trading image quality for speed. Since the time required to render a frame is proportional to the complexity of the scene, rendering lower resolution levels yield higher frame rates. When there is relative motion of the object with respect to the camera, or a large distance between the object and the camera in the scene, a lower level of detail is rendered instead of the highest resolution level, which is the original polygonal model. When the scene becomes static, lower frame rates may be acceptable, and a higher resolution level can be rendered yielding higher image quality.

Prior art methods for generating multi-resolution polygonal models from single-resolution polygonal models are described in "Multi-resolution Surface Modeling", Course Notes for Siggraph'97, edited by Paul Heckbert, which is here incorporated by reference in its entirety. In all such methods the input single-resolution model becomes the highest level of detail of the generated multi-resolution model.

Many prior art methods to generate multi-resolution polygonal models are based on "vertex clustering algorithms", and the multi-resolution polygonal models produced by such methods are called "clustered multi-resolution polygonal models". In a clustered multi-resolution polygonal model the vertices of each level of detail are partitioned into disjoint subsets of vertices called "clusters", and all the vertices in each cluster are collapsed into a single vertex of the previous (lower resolution) level of detail.

Collapsing vertices may produce duplicate faces, faces with fewer corners, collapsing of faces into edges, or total collapsing of faces into single vertices. Faces which do not collapse, as well as those which collapse into faces with fewer corners, are preserved in the previous level of detail. Duplicate faces, as well as those which collapse into single vertices, are discarded in the previous level of detail. Faces which collapse into edges are optionally preserved in some methods.

One such method to generate clustered multi-resolution polygonal models is described in U.S. Pat. No. 5,448,686 "Multi-Resolution Graphic Representation Employing at Least One Simplified Model for Interactive Visualization Applications", by P. Borrel and J. Rossignac, which is here incorporated by reference in its entirety. In this method vertices of one level of detail are partitioned into clusters based on geometric proximity.

In other prior art methods to generate clustered multi-resolution polygonal models, the clustering of vertices is described as a sequence of "edge collapse" operations. An edge collapse operation identifies the two endpoints of an edge of a level, reducing the number of vertices of the level by one, and the number of triangles of the level by two. One such method is described in U.S. patent application "Surface Simplification Preserving a Solid Volume and Respecting Distance Tolerances", Ser. No. 08/742,641 filed Nov. 1, 1996, by A. Gueziec, which is here incorporated by reference in its entirety.

Switching between consecutive levels of detail may produce visual artifacts. The correspondence between vertices in one level of detail and vertices in the previous level of a clustered multi-resolution polygonal model is used in the prior art to mitigate this problem, by smoothly transitioning, or "morphing", from one level to the next interpolating the position of vertex coordinates as a function of time.

Single-resolution polygonal models and multi-resolution polygonal models are increasingly stored in file servers and exchanged over computer networks. In both cases it is desirable to compress the models to reduce the total amount of data stored and transmitted.

When transmitting a multi-resolution polygonal model it is desirable to send the information necessary to reconstruct the levels in increasing order of level of detail, i.e., from low to high resolution, so that the receiver could render a level as soon as it has all the information associated with such level, and let the user interact with it before it has all the information necessary to render the next level. This is called progressive representation and transmission.

Methods for efficiently representing single-resolution polygonal models in compressed form are known in the prior art. Methods for representing clustered multiresolution polygonal models in progressive, but not compressed, form are also known in the prior art.

Since methods are known in the prior art for easily and efficiently triangulating arbitrary polygonal faces, many prior art methods only consider polygonal models defined by triangular meshes. A "triangular mesh" is a polygonal model in which all the faces are triangles.

One method to compress single resolution triangular meshes is described by Michael Deering in "Geometric Compression", Proceedings of ACM Siggraph'95, pp 13–20, August 1995, which is here incorporated by reference in its entirety; and in European Patent Applications "Method and apparatus for geometric compression of three-dimensional graphis", Ser. No. EP0 757 333, filed May 8, 1996, by Michael Deering, which is here incorporated by reference in its entirety. In this method a stack-buffer is used to store 16 of the previously used vertices instead of having random access to all the vertices of the model. The triangles of the mesh are partitioned into "generalized triangle meshes". Triangles which belong to the same generalized triangle mesh may share vertices, which are transmitted only once using the stack-buffer. But vertices common to triangles which belong to different generalized triangle meshes must be duplicated. In this method the connectivity of the triangular mesh is lost. The vertex positions and properties are quantized and entropy encoded.

Another such method to compress single resolution triangular meshes is described in U.S. Pat. No. 5,825,369 "Compression of Simple Geometric Models Using Spanning Trees", Ser. No. 08/688,572 filed Jul. 30, 1996, by J. Rossignac and G. Taubin, and in U.S. patent application "Compression of Geometric Models Using Spanning Trees", Ser. No. 08/685,422 filed Jul. 30, 1996, by J. Rossignac and G. Taubin, which are here incorporated by reference in its entirety. In this method the connectivity of the triangular mesh is preserved without loss of information. In this scheme the vertices of the triangular mesh are organized into a "vertex spanning tree", and the triangles into a "triangle spanning tree". The vertex spanning tree is a sub-graph of the "graph of the triangular mesh", which the graph defined by the vertices and edges of the triangular mesh. And the triangle spanning tree is a sub-graph of the "dual graph of the triangular mesh", which is the graph defined by the triangles and edges of the triangular mesh. The order of traversal of both trees define an "order for the edges of triangular mesh". The vertex positions and properties are quantized and entropy encoded. The prior art on graphs and trees is described by R. E. Tarjan in "Data Structures and Network Algorithms", SIAM, 1983; which is here incorporated by reference in its entirety.

One method for progressive transmission of triangular meshes is described by Hoppe in "Progressive Meshes", Proceedings of ACM SIGGRAPH'96, pp. 99–108; which is here incorporated by reference in its entirety. This scheme does not apply to general clustered multi-resolution polygonal models. It is restricted to clustered multi-resolution polygonal models generated by edge collapses with no change of connectivity. Another such scheme is described by Popovic et. al. in "Progressive Simplicial Complexes", Proceedings of ACM Siggraph'97, pp. 217–224, which is here incorporated by reference in its entirety. This scheme overcomes some of the limitations of Hoppe's method and allows some changes in connectivity.

The methods of Hoppe's and Popovic's build a progressive mesh representation that consists of a description of the transition from a simplified mesh to the original mesh. Hoppe represents this transition as a sequence of "vertex splits". Each of these vertex splits is specified by the index of a vertex of the mesh plus two edges incident to the given vertex. The edge split operation consists in cutting the mesh through the specified edges, resulting in the given vertex being split into two new vertices joined by an edge, and inserting two new triangles in the resulting whole. In addition, the displacements of the two new vertices with respect to the split vertex position in the previous level must be specified.

The method of Popovic et. al. is a generalization of Hoppe's scheme to lines, surfaces and volumes. A vertex split is replaced with a "generalized vertex split". With respect to the vertex split, additional information is necessary to encode whether the added vertex will add a point, a line segment, a triangle or a tetrahedron to the complex.

While Hoppe and Popovic claim that their methods can be used to compress clustered multi-resolution polygonal models generated by edge collapsing or generalized edge collapsing, these are not efficient compression schemes. They require in the order of N(log(N)) total bits of data to represent a triangular mesh of N vertices in progressive form. The other main problem with Hoppe's and Popovic's methods is that they do not apply to general clustered multi-resolution polygonal models.

On the other hand, Rossignac and Taubin method require in the order of N total bits of data to represent a single resolution mesh in compressed form, but do not apply to any multi-resolution model.

There is thus a long felt need to overcome these and other problems of the prior art. To date there is no method to efficiently represent in compressed form and progressively transmit clustered multi-resolution polygonal models.

OBJECTS OF THE INVENTION

An object of this invention is an improved system and method for compressing, storing, progressively transmitting, and progressively decompressing any clustered multi-resolution polygonal model.

Another object of this invention is an improved system and method for decomposing a clustering operation of a polygonal model as a connectivity preserving clustering operation and a anti-connectivity clustering operation, and for representing the clustering operation in compressed form.

SUMMARY OF THE INVENTION

This invention is a computer system and method that progressively stores and transmits compressed clustered multi-resolution polygonal models. The computer uses a data structure that represents a clustered multi-resolution polygonal model in n-dimensional space. The data structure has a connectivity record which encodes the connectivity information of the highest level of detail. The data structure also has a clustering record which encodes how the vertices of each level of detail are clustered to obtain the vertices of the next lower level of detail. The clustering record is organized in decreasing order of level of detail. The data structure also has a data record with information describing the vertex positions of the levels of detail, and optionally the corresponding properties. The fields of the data record are organized in increasing order of level of detail. The system also includes ways for creating this data structure from a clustered multi-resolution polygonal model, transmitting this information between computers, and compressing and decompressing this transmitted information.

BRIEF DESCRIPTION OF THE DRAWINGS

FIG. 2, comprising

FIG. 3, comprising

DETAILED DESCRIPTION OF THE INVENTION

Figure 1:
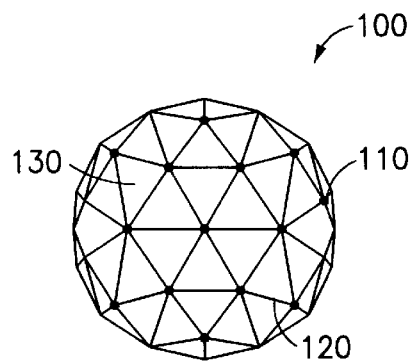
FIG. 1 is prior art example of polygonal model.

FIG. 1 is prior art example of polygonal model. The prior art on polygonal models is described by Foley et.al. in "Computer Graphics: Principles and Practice", Addison-Wesley, 1990; which is here incorporated by reference in its entirety. A polygonal model 100 is composed of vertices 110, edges 120, and faces 130.

A polygonal model with V vertices and F faces is usually represented in the prior art by a "vertex positions array" and a "face array". The position of each vertex of the polygonal model is represented in the vertex positions array by N floating point coordinates. The location of this N-dimensional vector in the vertex positions array is referred to as the "vertex index" of the vertex. Each face of the polygonal mesh mesh is represented in the face array by a "face number of vertices" plus one or more "face vertex indices". The location of the face number of vertices in the face array is referred to as the "face index" of the vertex.

An "edge" of a polygonal model is a pair of consecutive vertices of a face, without taking into account the order of the two vertices within the edge. The two vertices of an edge are called "endpoints" of the edge.

Figure 2A:
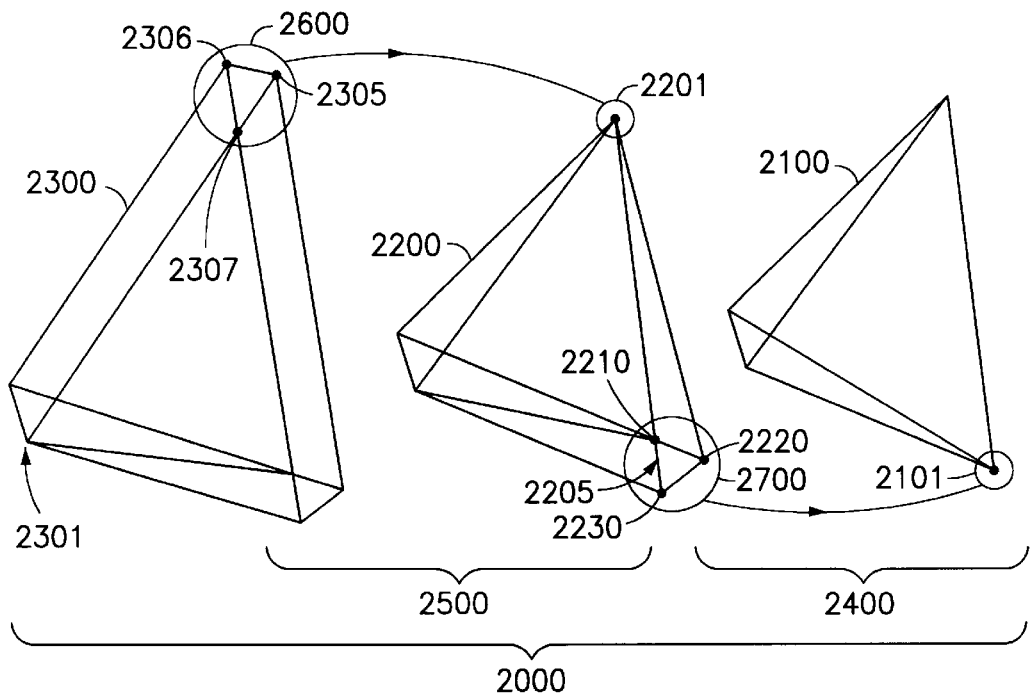
FIG. 2A, and FIG. 2B, is a prior art example of a clustered multi-resolution polygonal model.
Figure 2B:
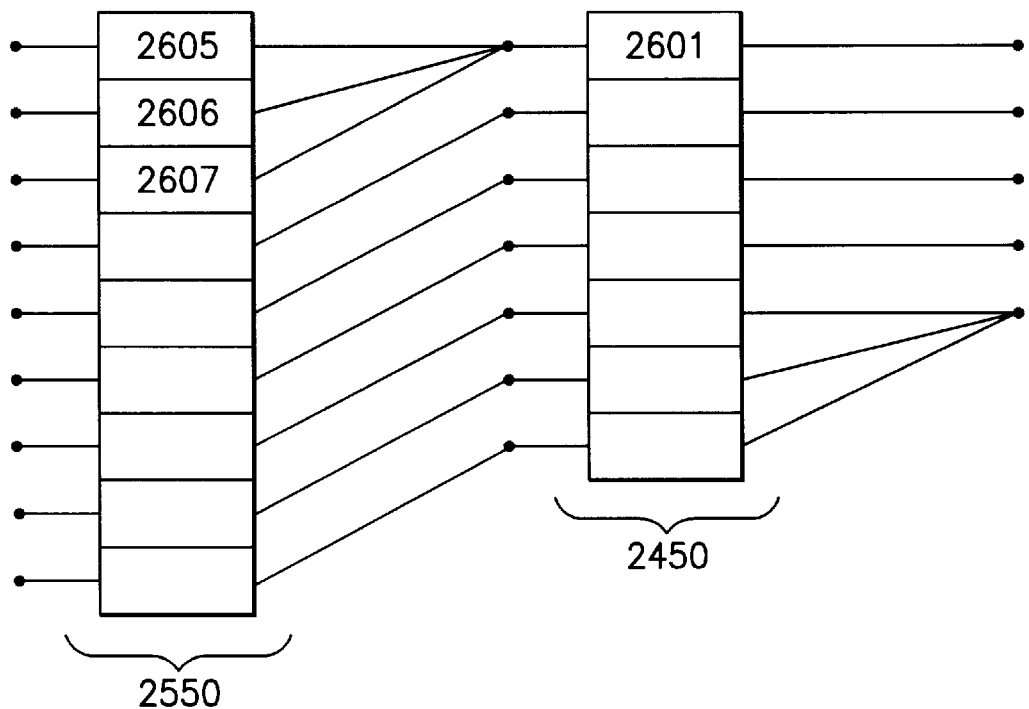

From the vertex indices and the face indices, an "edge array" can be constructed to represent the edges explicitly. The edge array lists pairs of edge endpoints; preferably, the edges appear sorted lexicographically in the edge array, which smaller indices coming first; this provides a convention for enumerating the edges; each edge of the manifold triangular mesh has a corresponding "edge index" preferably defined as the position of the edge in the edge array; this convention is not a limitation upon the practice of the present invention; other conventions for enumerating the edges can be adopted;

FIG. 2, comprising FIG. 2A, and FIG. 2B, is a prior art example of a clustered multi-resolution polygonal model. A clustered multi-resolution polygonal model 2000, composed of levels of detail 2100, 2200, and 2300, is usually represented in the prior art by specifying the highest resolution level of detail 2300, and a sequence of recursive vertex clustering operations 2500, and 2400. Each vertex clustering operation describes how to construct the previous level of detail from the current level, and can be specified, without loss of generality, as a partition of the vertices of the corresponding level of detail into disjoint subsets, the subsets of vertices 2600, 2700, being in one-to-one correspondence with the vertices of the previous level of detail 2201, 2101. Each partition 2400, 2500, is usually represented in the prior art by a "cluster array" 2450, 2550, with the number of elements of each cluster array 2450, 2550, equal to the number of vertices of the corresponding level of detail 2200, 2300. Each "cluster array element" 2605, 2606, 2607 of the cluster array 2550 corresponds to one vertex 2305, 2306, 2307 of the current level, and the value of the cluster array element 2601 is the index 2201 of the corresponding vertex in the previous level of detail. Vertices of the current level 2305, 2306, 2307, whose corresponding cluster array elements have the same value collapsed into a "cluster representative" vertex 2201 in the previous level of detail.

Figure 3A:
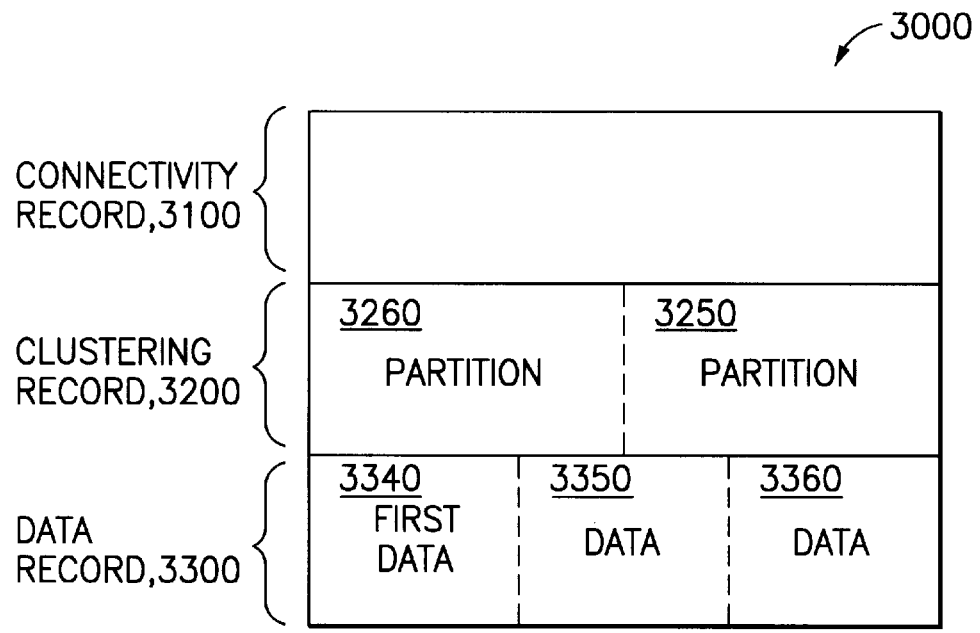
FIG. 3A and FIG. 3B, is a block diagram of a data structure for representing a clustered multi-resolution polygonal model.
Figure 3B:
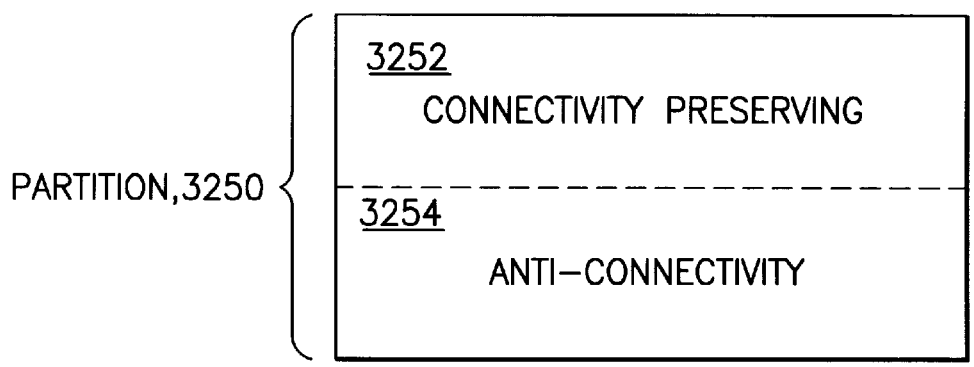

FIG. 3, comprising FIG. 3A and FIG. 3B, is a block diagram of data structure 3000 disclosed in this invention for representing a clustered multi-resolution polygonal model. The data structure is composed of a "connectivity record" 3100, a "clustering record" 3200, and a "data record" 3300. The connectivity record 3100 contains the information necessary to reconstruct the connectivity of the highest level of detail. The clustering record 3200 is composed of one or more "partition fields" 3250, 3260, each partition field 3250 with information about how to partition the vertices of one level of detail 2200 into one or more clusters 2700, 2800, each cluster 2700 composed of one or more vertices 2210, 2220, 2230 of the level of detail 2200, and associated with one vertex 2900 of the previous level of detail 2100. The partition fields 3250, 3260 ordered in the clustering record 3200 in decreasing order of level of detail. The data record 3300 is composed of one "first data field" 3340, and one or more "data fields" 3350, 3360, the first data field 3340 with information necessary to reconstruct the vertex positions and properties of the first level of detail 2100. Each data field 3350 with information necessary to reconstruct the vertex positions and (optionally) the properties of one level of detail 2200. The data fields 3350, 3340 ordered in the data record 3300 in increasing order of level of detail.

Figure 4:
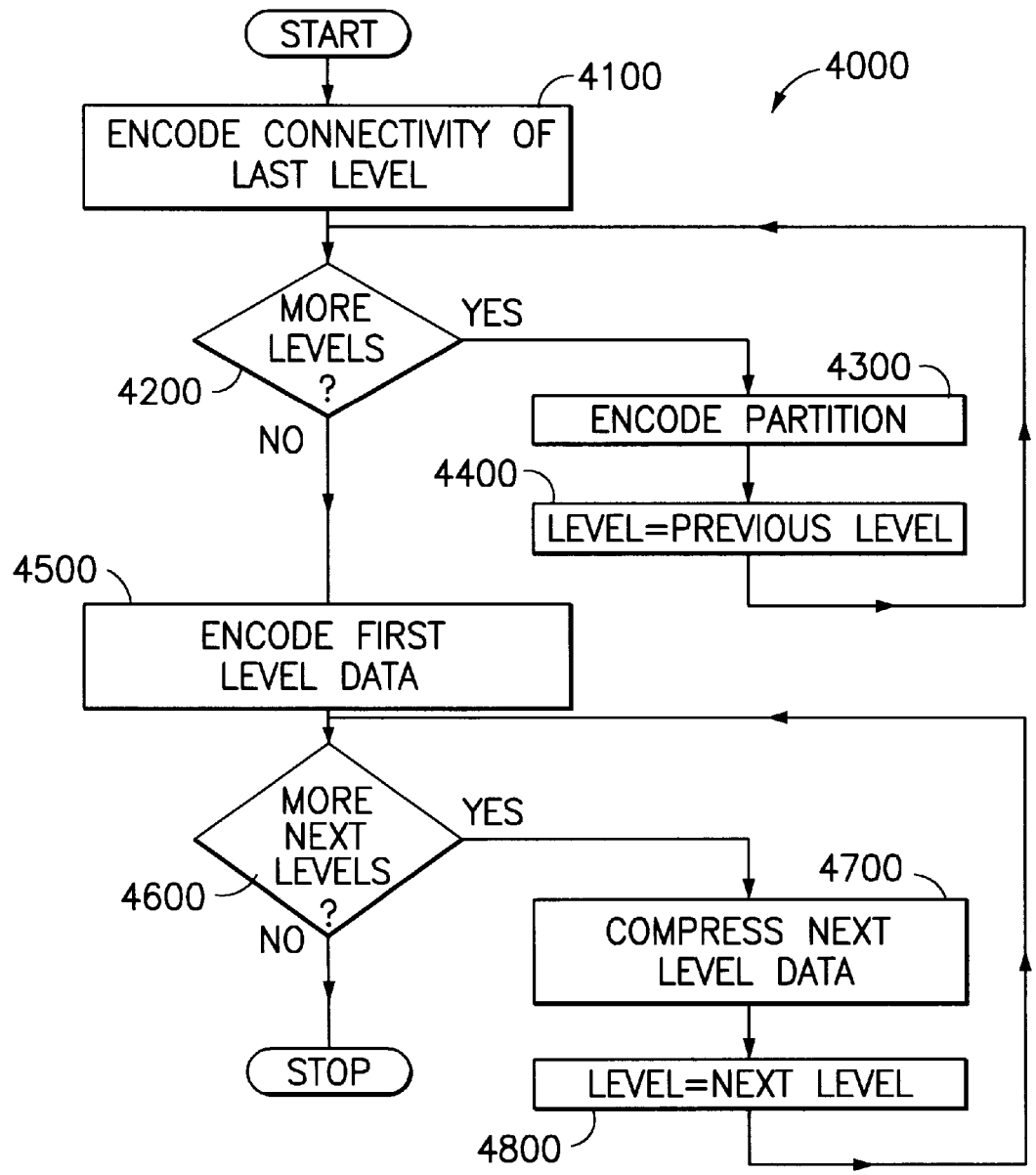
FIG. 4 is a flow chart of a method for compressing a clustered multi-resolution polygonal model.

FIG. 4 is a flow chart of a method 4000 for compressing a clustered multi-resolution polygonal model. In step 4100 the connectivity of the highest resolution level is encoded, and the resulting data is placed in the connectivity record 3100 of data structure 3000. In steps 4200, 4300, and 4400 the clustering operations are encoded, and the resulting data is placed in the partition fields 3260, 3250 of the clustering record 3200 of data structure 3000. In step 4300 a clustering operation corresponding to one level of detail is encoded, and the resulting data is placed in the corresponding partition field of the clustering record. In step 4400 the level counter is decremented, and in step 4200 the lowest resolution level is detected, signaling the end of the connectivity encoding phase. The clustering operations are encoded, and the resulting data is placed in the clustering record 3200, in decreasing order of level of detail, i.e., from highest level to lowest level. In step 4500 the geometric and (optionally) property data corresponding to the lowest level of detail is compressed and the resulting data is placed in the first data field 3340 of the data record 3300, in the data structure 3000. In steps 4600, 4700, and 4800, the geometry and (optionally) property data corresponding to the subsequent levels of detail is compressed, and placed in the data fields 3350, 3360 of the data record 3300. The geometry and (optionally) property data corresponding to the different levels of detail are compressed, and the resulting data is placed in the data record 3300, in increasing order of level of detail, i.e., from lowest resolution to highest resolution. In step 4700 the geometry and (optionally) property data corresponding to one level of detail is compressed, and the resulting data is placed in the corresponding data field of the data record. In step 4800 the level counter is incremented, and in step 4600 the highest level of detail is detected, producing the method to stop.

Figure 5:
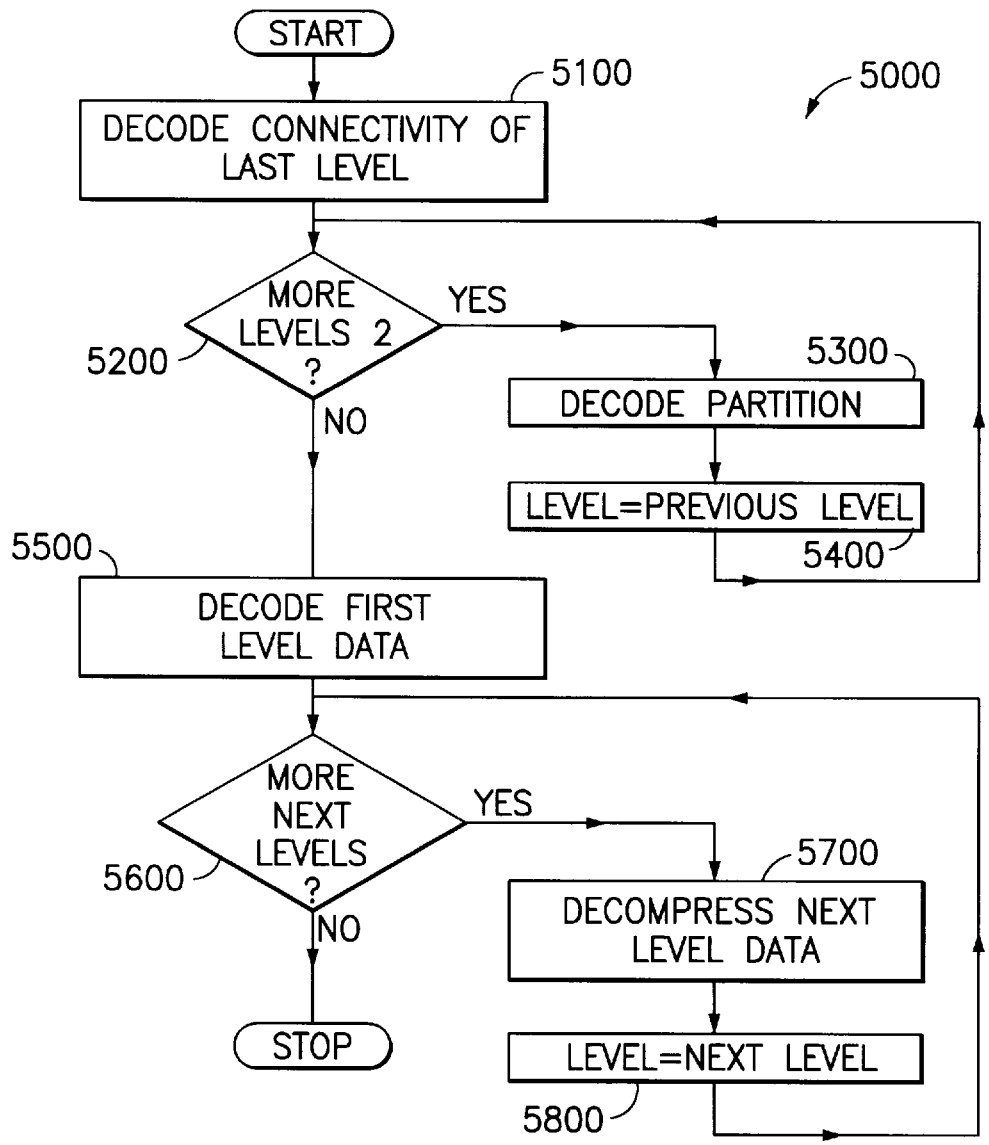
FIG. 5 is a flow chart of a method for decompressing a clustered multi-resolution polygonal model.

FIG. 5 is a flow chart of a method 5000 for decompressing a clustered multi-resolution polygonal model. In step 5100 the connectivity of the highest resolution level is decoded using the data present in the connectivity record 3100 of data structure 3000, and populating the face array of the highest resolution level of detail. In steps 5200, 5300, and 5400 the clustering operations are decoded, using the data present in the partition fields 3260, 3250 of the clustering record 3200 of data structure 3000, and populating the cluster arrays 2550, 2450. In step 5300 a clustering operation corresponding to one level of detail is decoded, and the resulting data is placed in the cluster array of the multi-resolution polygonal model. In step 5400 the level counter is decremented, and in step 5200 the lowest resolution level is detected, signaling the end of the connectivity decoding phase. The clustering operations are decoded, and the resulting data is placed in the cluster arrays 2550, 2450, in decreasing order of level of detail, i.e., from highest level to lowest level. In step 5500 the geometric and (optionally) property data present in data field 3340 of the data record 3300 corresponding to the lowest level of detail is decompressed, and the resulting data is placed in the vertex positions array and in the properties arrays. In steps 5600, 5700, and 5800, the geometry and (optionally) property data corresponding to the subsequent levels of detail is decompressed, from the data present in the data fields 3350, 3360 of the data record 3300. The geometry and (optionally) property data corresponding to the different levels of detail are decompressed, and the resulting data is placed in the vertex positions and (optionally) property arrays, in increasing order of level of detail, i.e., from lowest resolution to highest resolution. In step 5700 the geometry and (optionally) property data corresponding to one level of detail is decompressed, and the resulting data is placed in the corresponding vertex positions and (optionally) property arrays. In step 5800 the level counter is incremented, and in step 5600 the highest level of detail is detected, producing the method to stop.

In a preferred implementation the connectivity record 3100 is composed of a "triangle record", the triangle record composed of one or more "triangle fields", each triangle field composed of three "triangle vertex index" sub-fields.

In another preferred implementation the connectivity record 3100 is composed of a "face record", the face record composed of one or more "face fields", each face field composed of a "number of vertices" sub-field, and one or more "face vertex index" sub-fields.

In another more preferred implementation the connectivity of the highest level of detail is represented in compressed form in the connectivity record 3100 using the method described in commonly assigned U.S. Pat. No. 5,825,369 entitled "Compression of Simple Geometric Models Using Spanning Trees", Ser. No. 08/688,572 filed Jul. 30, 1996, by J. Rossignac and G. Taubin.

In another more preferred implementation the connectivity of the highest level of detail is represented in compressed form in the connectivity record 3100 using the method described in commonly assigned U.S. patent application entitled "Compression of Geometric Models Using Spanning Trees", Ser. No. 08/685,422 filed Jul. 30, 1996, by J. Rossignac and G. Taubin.

In a preferred implementation each partition field 3250 of the clustering record 3200 is composed of one or more "cluster lists", each cluster list corresponding to one cluster 2700 containing two or more vertices, and composed of two or more "cluster list elements", each cluster list element corresponding to one vertex belonging to the cluster. No cluster list is associated with clusters composed of exactly one vertex.

In a more preferred implementation each cluster list element is a vertex index 2210, 2220, 2230, of a vertex belonging to the cluster.

Figure 6:
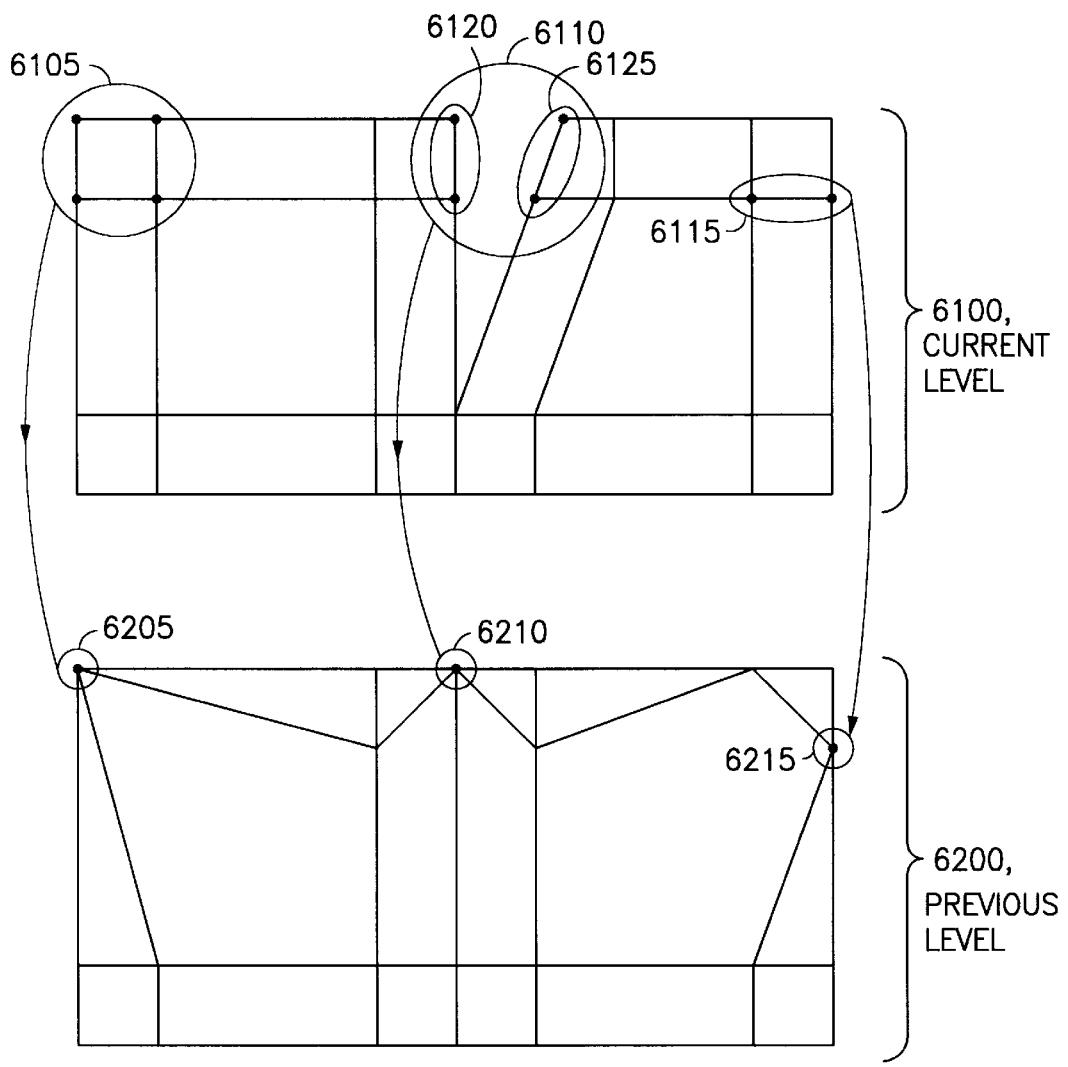
FIG. 6 illustrates the representation of clustering operations.

FIG. 6 illustrates the representation of clustering operations. Each clustering operation partitions the vertices of a "current level of detail" 6100 into one or more clusters of vertices 6105, 6110, 6115, each cluster associated with one vertex 6205, 6210, 6215 of a "previous level of detail" 6200. The edges of the current level of detail can be used to further partition each cluster into one or more "connected clusters" 6105, 6120, 6125, 6115. Two vertices joined by an edge of the current level of detail belong to the same connected cluster if the two vertices belong to the same cluster. The set of all connected clusters defines a new "connectivity-preserving" partition of the vertices of the current level of detail, which is finer that the partition determined by the clustering operation. The partition determined by the clustering operation can be described as further applying an "anti-connectivity" partition to the set of connected clusters. The anti-connectivity partition is defined by the association of connected clusters to clusters.

In a preferred implementation each partition field 3250 of the clustering record 3200 is composed of a "connectivity-preserving" sub-field 3252, and an "anti-connectivity" sub-field 3254. The connectivity preserving subfield describing the connectivity preserving partition, and the anti-connectivity sub-field describing the anti-connectivity partition.

In a preferred implementation the connectivity-preserving partition is encoded in subfield 3252 of the partition field 3250 as a "sequence of connect bits", composed of one or more "connect bits", each connect bit corresponding to one edge 2205 of the corresponding level of detail 2200, and where the value of the connect bit describes whether the two vertices joined by the edge belong to the same connected cluster or not.

In a more preferred implementation the sequence of connect bits is compressed.

In another more preferred implementation the sequence of connect bits is entropy encoded.

In another more preferred implementation the sequence of connect bits is run-length encoded.

In another more preferred implementation the sequence of connect bits is run-length and entropy encoded.

In a preferred implementation the anti-connectivity subfield 3254 of the partition field 3250 is composed of one or more "anti cluster lists", each anti cluster list corresponding to one cluster 2700 containing two or more connected clusters, and composed of one or more "anti cluster list elements", each anti cluster list element corresponding to one connected cluster belonging to the cluster. No cluster list is associated with clusters composed of exactly one connected clusters.

Figure 7:
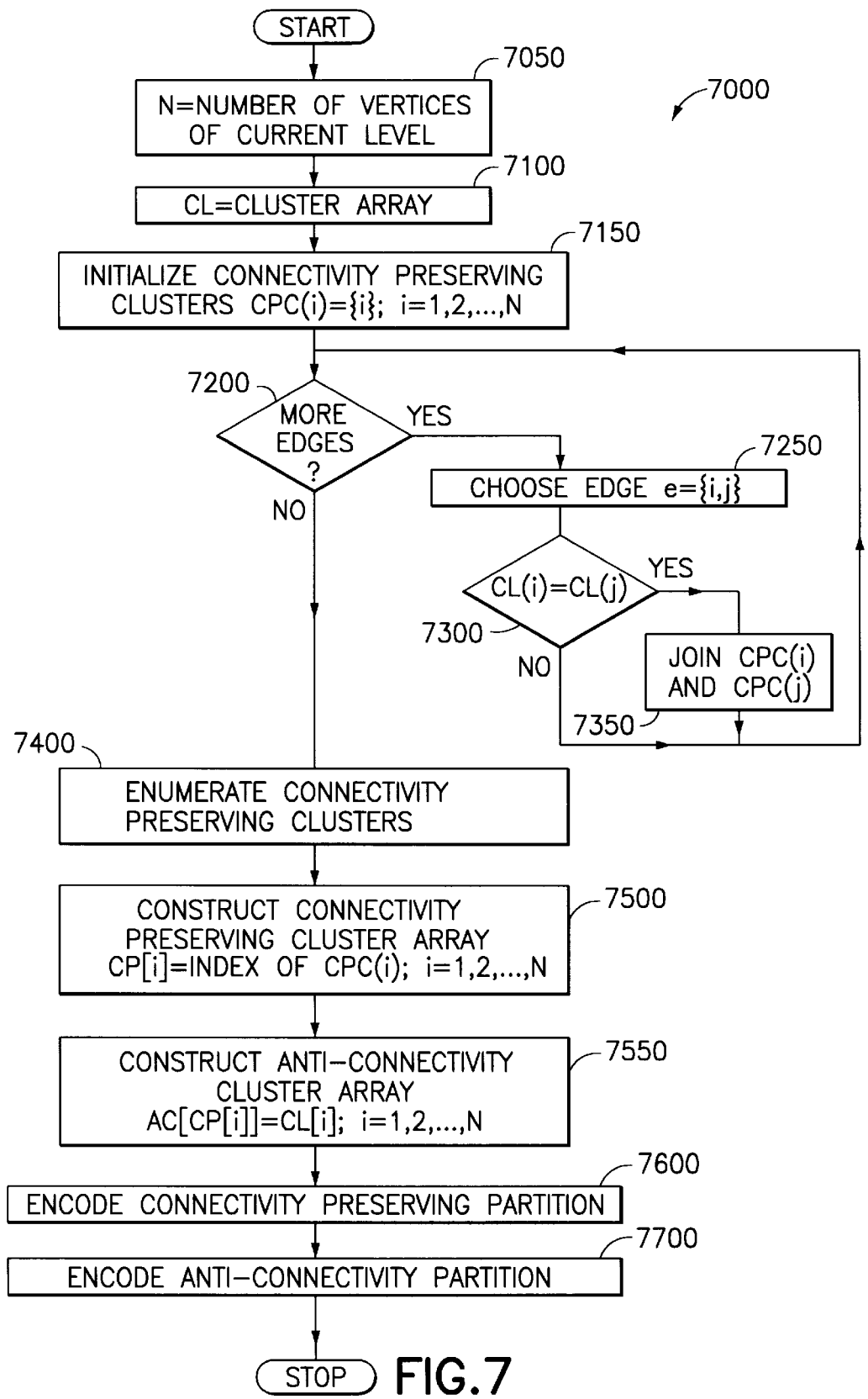
FIG. 7 is a flow chart of a method for decomposing a clustering operation into a connectivity-preserving partition and an anti-connectivity partition, and to encode such partitions

FIG. 7 is a flow chart of a method 7000 for decomposing a clustering operation into a connectivity-preserving partition and an anti-connectivity partition, and to encode such partitions in the subfields 3252 and 3254 of the partition field 3250 of the clustering record 3200. Method 7000 is a preferred implementation of step 4300 of method 4000. In step 7050 the number of vertices N of the current level is determined. The clustering operation clusters the vertices of the current level, with each resulting cluster corresponding to one vertex of the previous level. In step 7100, the cluster array CL representing the clustering operation determined. In step 7150 the connectivity preserving partition clusters are initialized as sets with a single element, one per vertex of the current level. In the loop defined by steps 7200, 7250, 7300, and 7350, some of these sets are joined together. In step 7250 one edge of the current level is chosen. In step 7300 it is determined if the endpoints of the edge belong to the same cluster of the clustering operation by comparing the corresponding values of the clustering array CL. If the endpoint of the edge do belong to the same cluster of the clustering operation, in step 7350 the connectivity preserving partition clusters that the two endpoints belong to are joined together. Note that these two connectivity preserving partition clusters may have been the same even before the join operation as a result of a previous join operation, in which case step 7350 will produce no change. In step 7200 it is determined if all the edges of the current mesh have been considered. If no more edges remain to be considered, the method proceeds to step 7400. In step 7400 consecutive indices are assigned to different connectivity preserving clusters, starting with index 1. In step 7500, the connectivity preserving cluster array is constructed with the value assigned to a vertex of the current level being equal to the index of the connectivity preserving cluster the vertex belongs to. Finally, in step 7550 anti-connectivity cluster array is constructed. The length of this array is equal to the number of different connectivity preserving cluster arrays, and its values are such that the application of the anti-connectivity partition to the set of connectivity-preserving clusters produces the same result as the application of the clustering operation to the vertices of the current level. In step 7600 the connectivity-preserving partition is encoded in the subfield 3252 of the partition field 3250 of the data structure 3000. In step 7700 the anti-connectivity partition is encoded in the subfield 3254 of the partition field 3250 of the data structure 3000.

Figure 8:
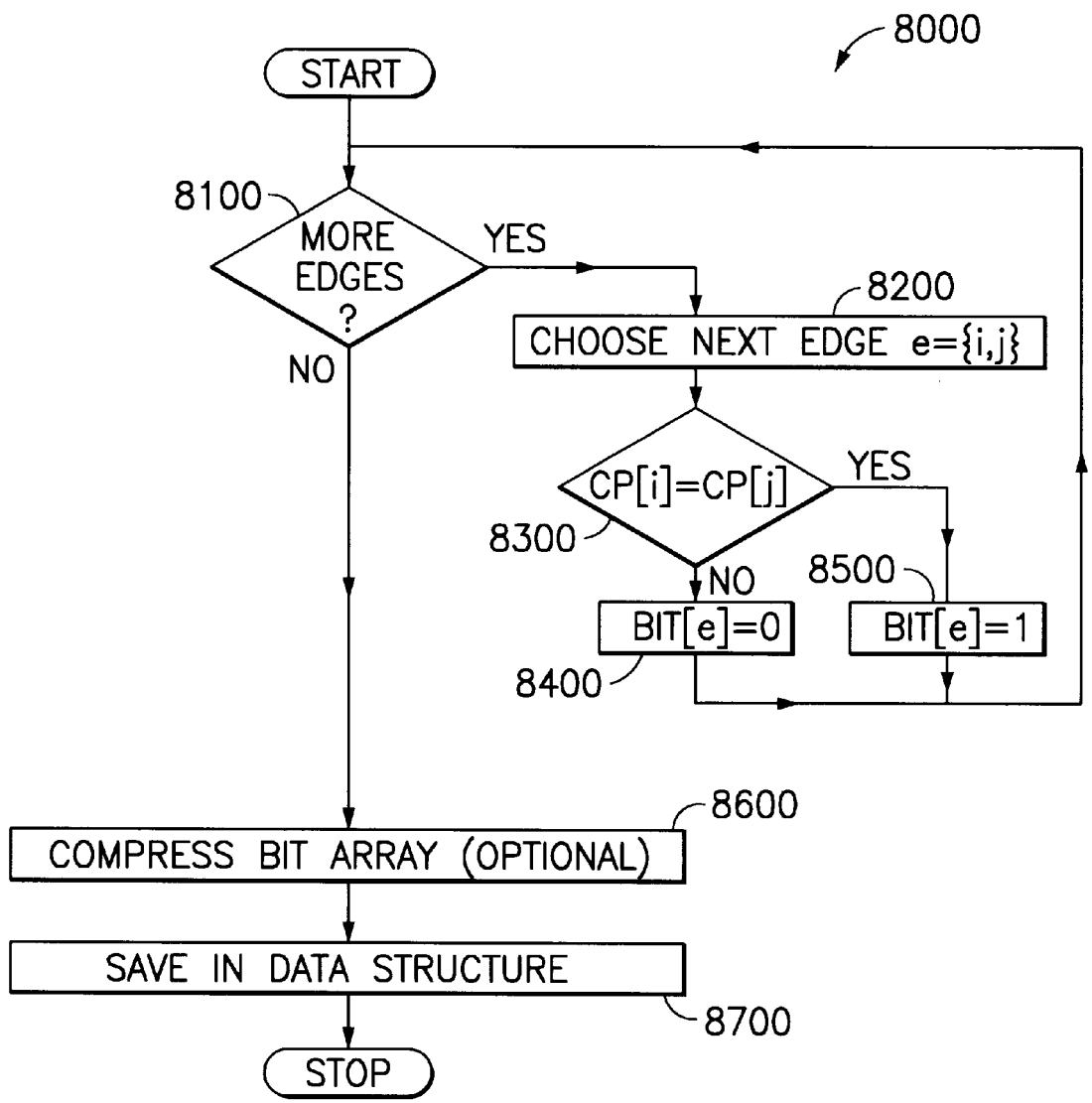
FIG. 8 is a flow chart of a preferred implementation of a method to encode the connectivity-preserving partition as a sequence of connect bits.

FIG. 8 is a flow chart of a preferred implementation of step 7600 of method 7000 to encode the connectivity-preserving partition as a sequence of connect bits in the subfield 3252 of the partition field 3250. In the loop defined by steps 8100, 8200, 8300, 8400, and 8500, the connect bit values are determined for all the edges of the current level of detail from the values stored in the connectivity preserving cluster array constructed by method 7000. In step 8100 it is determined whether all the connect bits have been determined or not. In step 8200 the next edge in the order defined by the edge array is chosen. In step 8300 it is determined whether the values of the connectivity-preserving cluster array at the endpoints of the edge are the same or not. In step 8400 the connect bit corresponding to the edge is set equalto 0 if the values of the connectivity-preserving cluster array at the endpoints of the edge are not the same. In step 8500 the connect bit corresponding to the edge is set equalto 1 if the values of the connectivity-preserving cluster array at the endpoints of the edge are the same. Once all the connect bits are determined, the sequence of connect bits is optionally compressed in step 8600. Finally, in step 8700, the resulting data is stored in the subfield 3252 of the partition field 3250.

Figure 9:
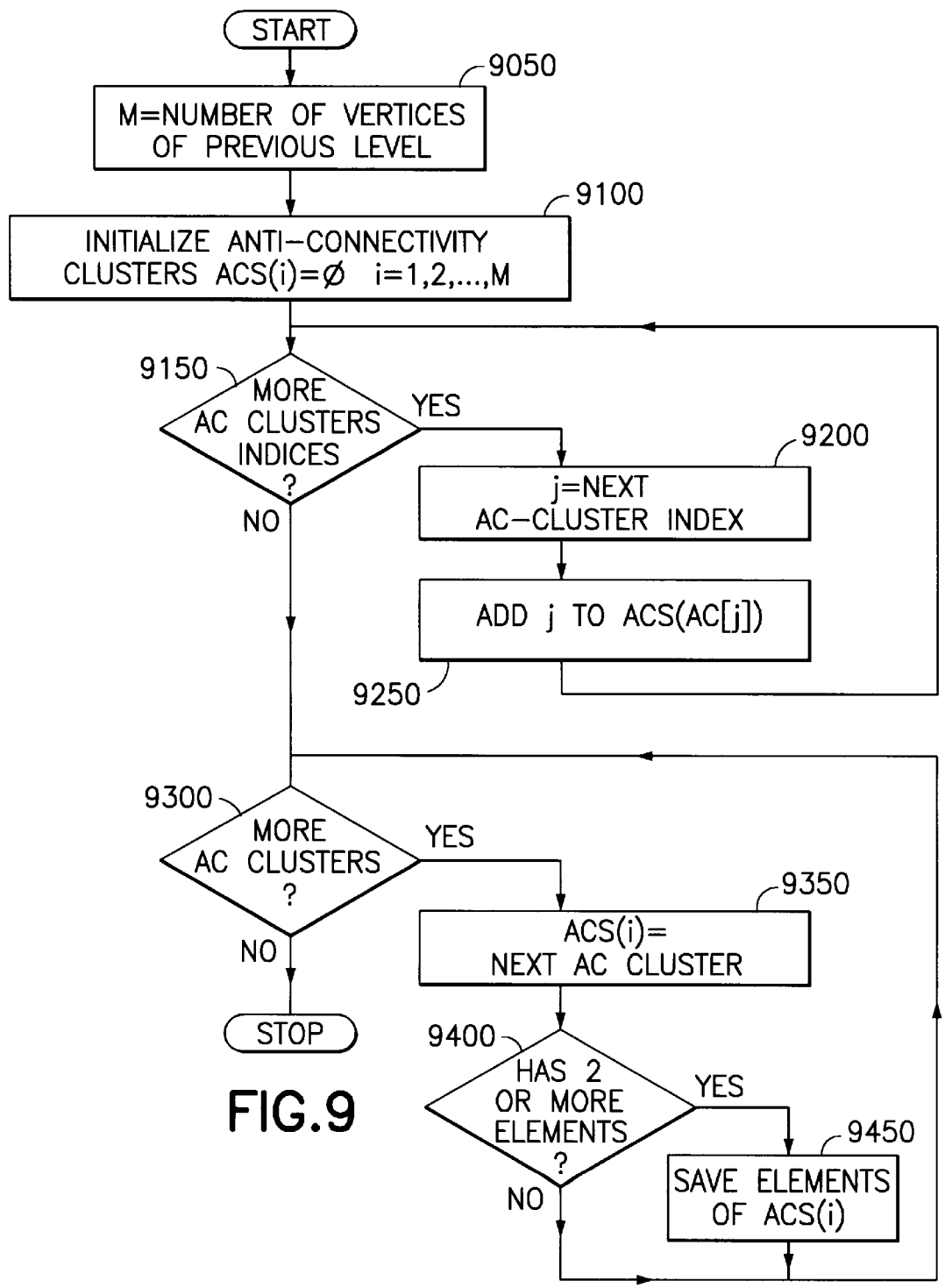
FIG. 9 is a flow chart of a preferred implementation of a method to encode the anti-connectivity partition.

FIG. 9 is a flow chart of a preferred implementation of step 7700 of method 7000 to encode the anti-connectivity partition into the subfield 3254 of the partition field 3250. In steps 9050, 9100, 9150, 9200, and 9250 the anti-connectivity clusters are first constructed as sets of anti-connectivity cluster indices, with one anti-connectivity cluster corresponding to each vertex of the previous level of detail. The anti-connectivity cluster indices are the indices of the anti-connectivity array constructed in step 7550 of method 7000. In step 9050 the number of vertices of the previous level of detail is determined. In step 9100 all the anti-connectivity clusters are initialize as empty sets. In step 9200 the next anti-connectivity cluster index is chosen, and in step 9250 it is added to the anti-connectivity cluster determined by the corresponding entry of the anti-connectivity array. In step 9150 it is determined whether all the anti-connectivity indices have been considered or not. Once all the anti-connectivity indices have been considered the method proceeds to step 9300. In the loop defined by steps 9300, 9350, 9400, and 9450, the anti-connectivity clusters with two or more elements are determined and saved as lists of anti-connectivity cluster indices in the subfield 3254 of the partition field 3250. In step 9300 it is determined whether all the anti-connectivity clusters have been considered or not. In step 9350 the next anti-connectivity cluster is chosen. In step 9400 it is determined whether the chosen anti-connectivity cluster has two or more elements or not. If it has two or more elements, in step 9450 it is saved as a list of anti-connectivity cluster indices in the subfield 3254 of the partition field 3250.

Figure 10:
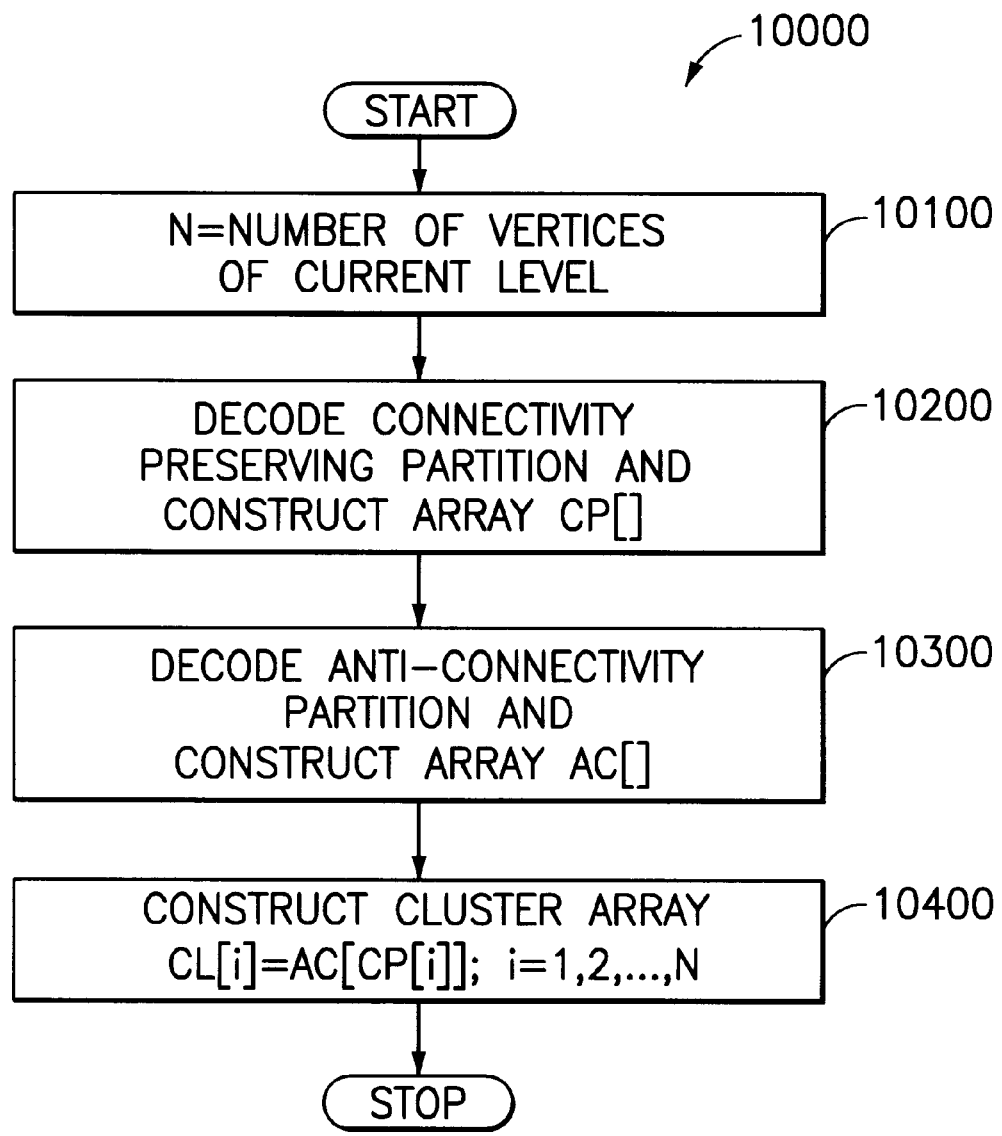
FIG. 10 is a flow chart of a method for decoding the connectivity-preserving and anti-connectivity partitions and to compose them to recover the a clustering operation.

FIG. 10 is a flow chart of a method 10000 for decoding the connectivity-preserving and anti-connectivity partitions encoded in the subfields 3252 and 3254 of the partition field 3250, and to compose them to recover the a clustering operation. Method 10000 is a preferred implementation of step 5300 of method 5000. In step 10100 the number of vertices of the current level of detail is determined. In step 10200 the connectivity-preserving partition is decoded from the data stored in subfield 3252 of the partition field 3250 of the data structure 3000, and the connectivity-preserving cluster array is reconstructed. In step 10300 the anti-connectivity partition is decoded from the data stored in subfield 3254 of the partition field 3250 of the data structure 3000, and the anti-connectivity preserving cluster array is reconstructed. In step 10400 the connectivity-preserving and anti-connectivity cluster arrays are composed producing the cluster array of the clustering operation.

Figure 11:
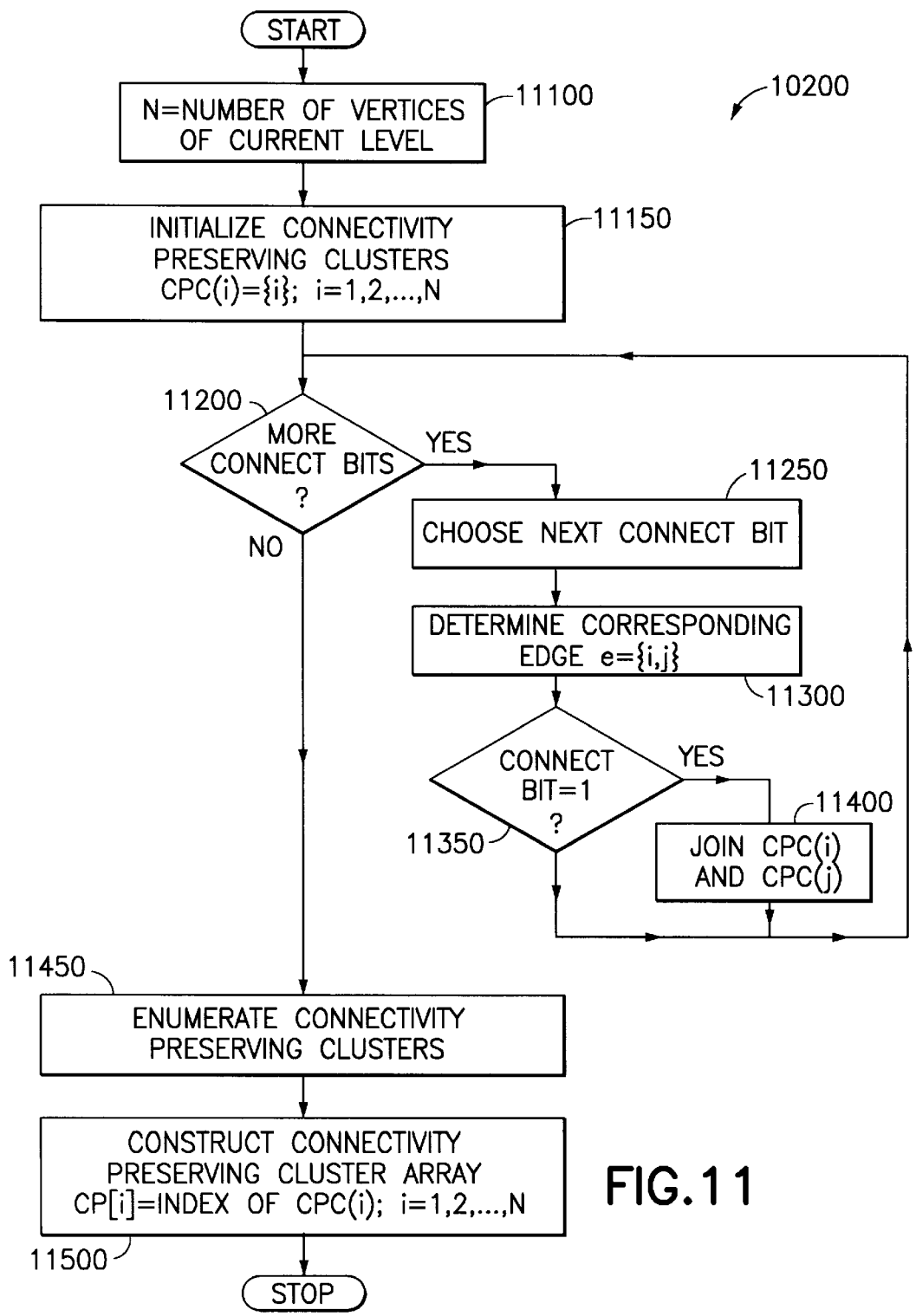
FIG. 11 is a flow chart of a preferred implementation of a method to decode the connectivity preserving partition from a sequence of connect bits, and to reconstruct the corresponding connectivity preserving cluster array.

FIG. 11 is a flow chart of a preferred implementation of step 10200 of method 10000 to decode the connectivity preserving partition from the sequence of connect bits stored in the subfield 3252 of the partition field 3250, and to reconstruct the corresponding connectivity preserving cluster array. In step 11100 the number of vertices N of the current level is determined. In step 11150 the connectivity preserving partition clusters are initialized as sets with a single element, one per vertex of the current level. In the loop defined by steps 11200, 11250, 11300, 11350, and 11400, some of these sets are joined together. In step 11250 the next connect bit in the sequence of connect bits is chosen. In step 11300 the corresponding edge of the current level of detail is determined, as well as its endpoint. In step 11350 it is determined if the value of the connect bit is equal to one or not. If the value of the connect bit is equal to 1, in step 11400 the connectivity preserving partition clusters that the two endpoints belong to are joined together. Note that these two connectivity preserving partition clusters may have been the same even before the join operation as a result of a previous join operation, in which case step 11400 will produce no change. In step 11200 it is determined if all the connect bits of the sequence of connect bits have been considered. If no more connect bits remain to be considered, the method proceeds to step 11450. In step 11450 consecutive indices are assigned to different connectivity preserving clusters, starting with index 1. And in step 11500, the connectivity preserving cluster array is constructed with the value assigned to a vertex of the current level being equal to the index of the connectivity preserving cluster the vertex belongs to.

Figure 12:
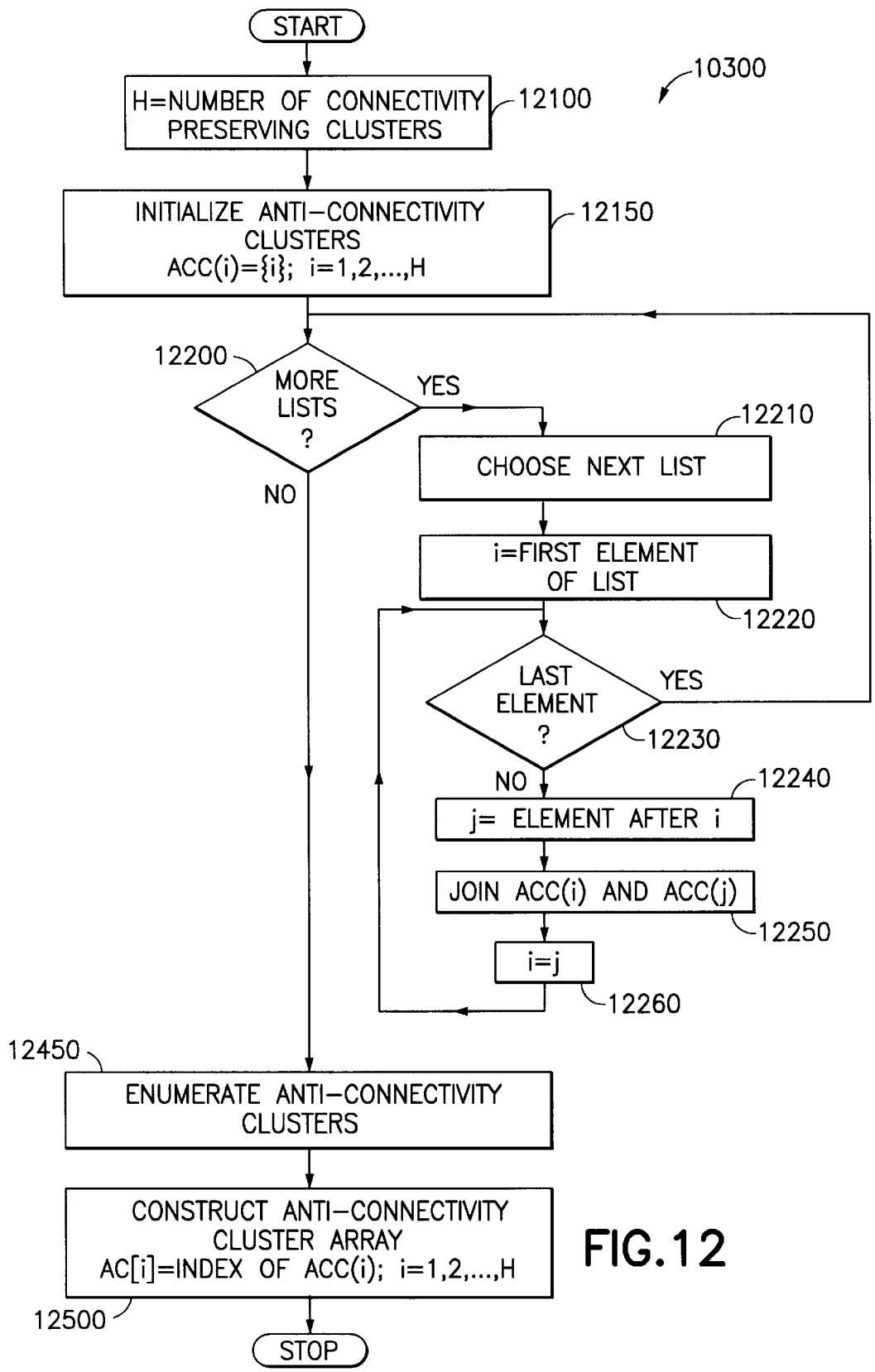
FIG. 12 is a flow chart of a preferred implementation of a method to decode the anti-connectivity partition from a lists of connectivity preserving cluster indices, and to reconstruct the corresponding anti-connectivity cluster array.

FIG. 12 is a flow chart of a preferred implementation of step 10300 of method 10000 to decode the anti-connectivity partition from the lists of connectivity preserving cluster indices stored in the subfield 3254 of the partition field 3250, and to reconstruct the corresponding anti-connectivity cluster array. In step 12100 the number of connectivity clusters N of the current level is determined. In step 12150 the anti-connectivity partition clusters are initialized as sets with a single element, one per connectivity preserving cluster of the current level. In the loop defined by steps 12200, 12210, 12220, 12230, 12240, 12250, and 12260, some of these sets are joined together. In step 12210 the next list of connectivity preserving cluster indices stored in subfield 3254 is chosen. In step 12220 the first element of the list is determined. In step 12240 the element following the previously determined element of the list is determined. In step 12250 the anti-connectivity partition clusters that the last two previously determined elements of the list belong to are joined together. Note that these two anti-connectivity partition clusters may have been the same even before the join operation as a result of a previous join operation, in which case step 12250 will produce no change. In step 12260 the pointer to the last determined element of the list is advanced. In step 12230 it is determined whether the last determined element of the list is the last element of the list or not. If the last determined element of the list is the last element of the list, the method proceeds to step 12450. In step 12450 consecutive indices are assigned to different anti-connectivity clusters, starting with index 1. And in step 12500, the anti-connectivity cluster array is constructed with the value assigned to a vertex of the current level being equal to the index of the anti-connectivity cluster the vertex belongs to.

In another more preferred implementation, the sequence of connect bits is described by a "parameterized bit pattern", the parameterized bit pattern composed of one or more "bit parameters", describing how to reconstruct the sequence of connect bits.

In a yet more preferred implementation, the connectivity record contains information to organize the vertices of the last level of detail as a "rooted spanning tree". The bit parameters determine a "vertex tree value" for each vertex as function of the bit parameters and the depth of the vertex in the rooted spanning tree. The value of the connect bit corresponding to an edge of the rooted spanning tree is determined by whether the vertex tree values of the two vertices joined by the edge are the same or not. All the connect bits associated with edges of the triangle mesh not belonging to the rooted spanning tree have value zero.

In a preferred implementation the first data field 3340 contains the values of the vertex coordinates and (optionally) the properties of the lowest resolution level of detail, and each data field 3350, 3360, contains the values of the vertex coordinates and (optionally) the properties of each subsequent level of detail.

In a more preferred implementation the vertex coordinates, and (optionally) the properties of the lowest resolution level of detail are computed by evaluating an "first prediction function" and then adding a "first correction vector". The first predictor function being a function of zero or more "first predictor parameters" and zero or more elements of the lowest resolution level of detail previously computed, the values of the first predictor parameters, and the first correction vectors, stored in the first data field 3340.

In another more preferred implementation the correspondence between the vertices and triangles of each subsequent level of detail and the vertices and triangles of the previous level of detail defined by the cluster array 2450, 2550 is used to represent the coordinates of each vertex of each subsequent level of detail as the sum of the coordinates of the corresponding vertex of the previous level of detail plus a "vertex displacement", and (optionally) the coordinates of each property vector of each subsequent level of detail as the sum of the coordinates of the corresponding property vector of the previous level of detail plus a property vector displacement. Instead of the vertex coordinates and (optionally) the properties, each data field 3350, 3360, contains the displacements.

In another more preferred implementation the vertices and (optionally) the properties of each subsequent level of detail are computed by evaluating a "predictor function" and then adding a "correction vector". The predictor function being a function of zero or more "predictor parameters" and zero or more elements of the previous level of detail, the values of the predictor parameters, and the correction vectors, stored in the data fields 3350, 3360.

In a yet more preferred implementation each correction vector is further computed by evaluating an "intra-level prediction function" and then adding a "second correction vector". The intra-level predictor function being a function of zero or more "intra-level predictor parameters" and zero or more elements of the current level of detail previously computed, the values of the predictor parameters, the intra-level predictor parameters, and the second correction vectors, stored in the data fields 3350, 3360.

Figure 13:
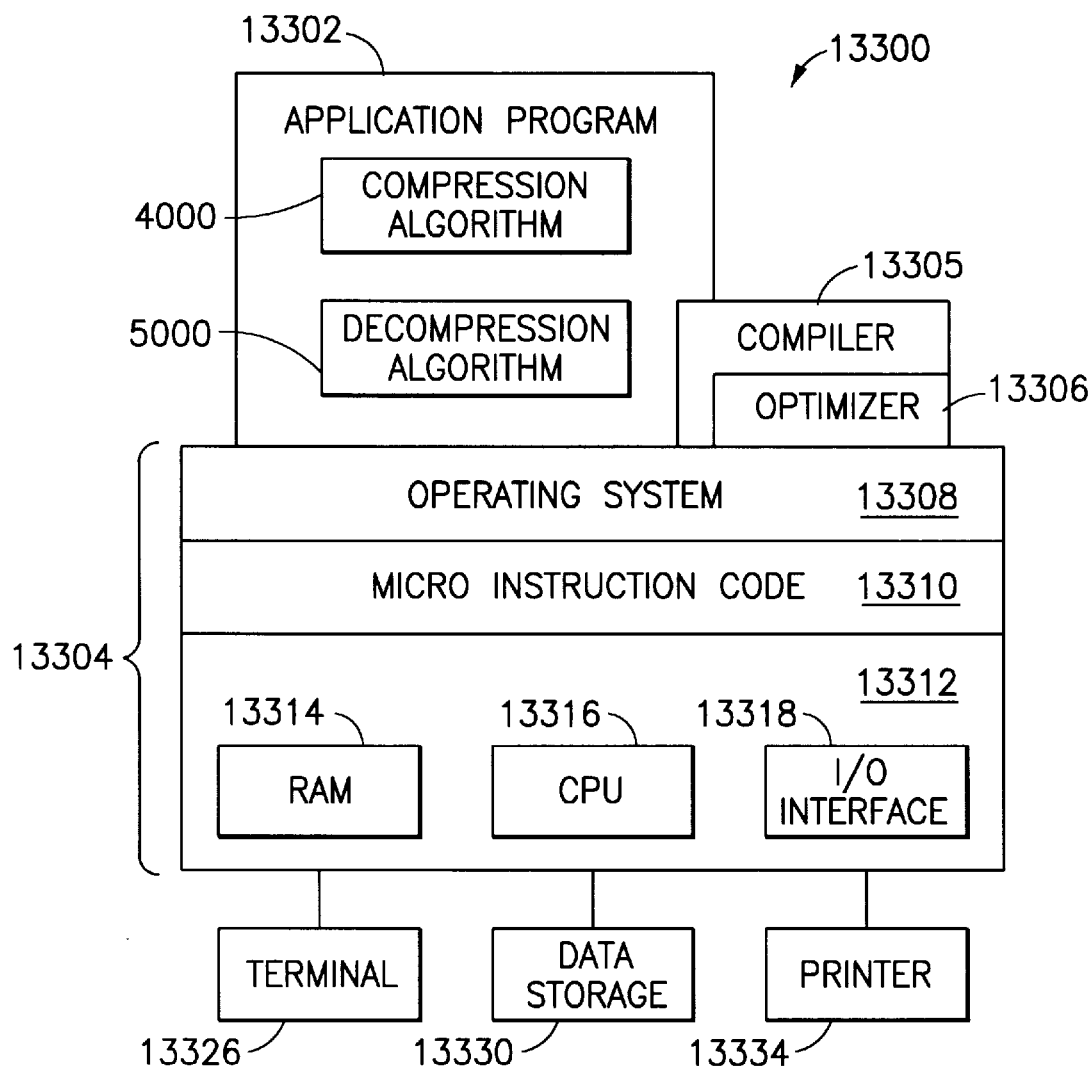
FIG. 13 is a block diagram showing an example computer system on which a preferred embodiment of the present invention operates.

FIG. 13 is a block diagram showing an example computer system 13300 on which a preferred embodiment of the present invention operates. The preferred embodiment includes one or more application programs 13302. One type of application program 13302 is a compiler 13305 which includes an optimizer 13306. The compiler 13305 and optimizer 13306 are configured to transform a source (like other application programs 13302) program into optimized executable code. More generally, the source program is transformed to an optimized form and then into executable code. The compiler 13305 and optimizer 13306 operate on a computer platform 13304 that includes a hardware unit 13312. Some application programs 13302 that run on the system 13300 include the compression 4000 and decompression 5000 processes describe above.

The hardware unit 13312 includes one or more central processing units (CPU) 13316, a random access memory (RAM) 13314, and an input/output interface 13318. Microinstruction code 13310, for instance a reduced instruction set, may also be included on the platform 13304. Various peripheral components may be connected to the computer platform 10304 including a graphical interface or terminal 13326, a data storage device 13330, and a printing device 13334. An operating system 13308 coordinates the operation of the various components of the computer system 13300. An example of computer system 13300 like this is the IBM RISC System/6000 (RISC System/6000 is a trademark of the IBM Corporation.) It is readily understood that those skilled in the computer arts will be familiar with many equivalent computer systems 17300.

Figure 14:
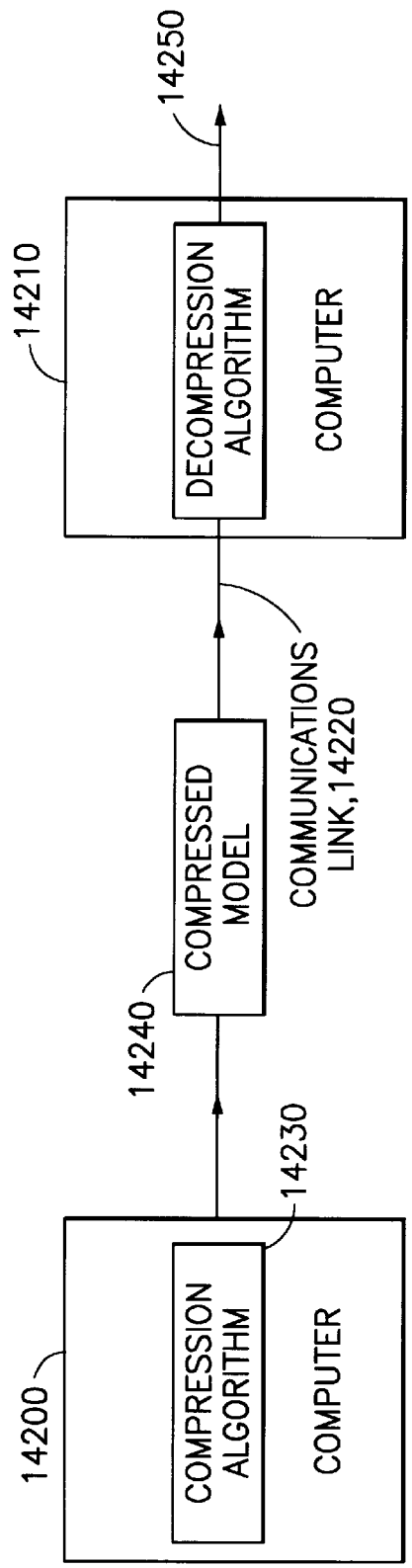
FIG. 14 is a diagram that shows a first computer connected to a second computer through a communications link.

FIG. 14 is a diagram that shows a first computer 14200 connected to a second computer 14210 through a communications link 14220. Examples of communications links are serial links (RS-232), parallel links, radio frequency links, and infra red links. Networks (LAN, WAN) are also prior art examples of communication links. Networks are commonly known. One example of network is the Internet. See U.S. Pat. No. 5,371,852 to Attanasio et. al. filed on Oct. 14, 1992, which is herein incorporated by reference in its entirety. Computer 14200 compresses a triangular mesh by running a geometric compression process 4000 and sends the resulting data structure 3000 trough the communication link 14220. Computer 14210 receives the data structure 3000 and decompresses the triangular mesh by running a geometric decompression process 5000.

Given this disclosure alternative equivalent embodiments will become apparent to those skilled in the art. These embodiments are also within the contemplation of the inventors.

I claim:

1. A system for compressing a clustered multi-resolution polygonal model comprising:
   a memory containing a polygonal model with two or more levels of detail with progressively more resolution, each level of detail having a plurality of vertices forming a plurality of triangles, each level of detail having a geometric information about the position of the vertices in space and each level of detail having a connectivity information about the association between each triangle and the vertices that form the triangle, the memory further having a clustering information for each level of detail about how a plurality of sets of vertices in each level of detail are clustered and how each of the respective clusters correspond to a vertex in a level of detail with a next lower resolution;
   a central processing unit (CPU);
   a connectivity process, executed by the CPU, that identifies the connectivity information of a highest resolution level of detail;
   a clustering process, executed by the CPU, that orders the clustering information for each level of detail, from the level of detail with the highest resolution to the level of detail with the lowest resolution, where the clustering information is compressed by a clustering compression process having the following steps:
      first, determining a connectivity preserving partition of the vertices of the level of detail into one or more connected clusters, with two vertices joined by an edge of the level of detail belonging to the same connected cluster if the clustering information determines that the two vertices are clustered into the same set, and
      second, determining an anti-connectivity partition of the connected clusters into one or more sets of connected clusters, with two connected clusters belonging to the same set of connected clusters if the clustering information determines that the vertices that belong to the two connected clusters are clustered into the same set; and
   a geometry process, executed by the CPU, that orders the geometric information of each level of detail from the level of detail with lowest resolution to the level of detail with highest resolution.

2. A system, as in claim 1, where the connectivity preserving partition is represented in compressed form as a sequence of connect bits composed of one or more connect bits, each connect bit corresponding to one edge of the corresponding level of detail, and where the value of the connect bit describes whether the two vertices joined by the edge belong to the same connected cluster or not.

3. A system, as in claim 2, where the sequence of connect bits is compressed.

4. A system, as in claim 3, where the sequence of connect bits is entropy encoded.

5. A system, as in claim 3, where the sequence of connect bits is run-length encoded.

6. A system, as in claim 2, where the sequence of connect bits is represented by a parameterized bit pattern, the parameterized bit pattern composed of one or more bit parameters, the bit parameters determining the values of the connect bits in the sequence of connect bits.

7. A system, as in claim 1, where the anti-connectivity partition is represented in compressed form as one or more anti cluster lists, each anti cluster list corresponding to one set of connected cluster containing two or more connected clusters, and composed of one or more anti cluster list elements, each anti cluster list element corresponding to one connected cluster belonging to the set of connected clusters, and with no cluster list associated with sets of connected clusters composed of exactly one connected cluster.

8. A system, as in claim 5, where the geometric information is compressed.

9. A system, as in claim 8, where the geometric information of the levels of detail of higher resolution than the lowest level of detail are compressed using the correspondence between the vertices and triangles of each level of detail and the vertices and triangles of the next lower level of detail defined by the clustering information of the level of detail to represent the coordinates of each vertex of the level of detail as the sum of the coordinates of the corresponding vertex of the next lower level of detail plus a vertex displacement.

10. A system, as in claim 8, where the geometric information of the levels of detail of higher resolution than the lowest level of detail are compressed using the correspondence between the vertices and triangles of each level of detail and the vertices and triangles of the next lower level of detail defined by the clustering information of the level of detail to represent the coordinates of each vertex of the level of detail as the sum of the a predictor function plus a vertex correction, the predictor function being a function of zero or more predictor parameters and zero or more elements of the next lower level of detail.

11. A system, as in claim 10, where each vertex correction is further computed by evaluating an intra-level prediction function and then adding a second correction vector, the intra-level predictor function being a function of zero or more intra-level predictor parameters and zero or more elements of the current level of detail previously computed.

12. A system for compressing a clustered multi-resolution polygonal model comprising:

a memory containing a polygonal model with two or more levels of detail with progressively more resolution, each level of detail having a plurality of vertices forming a plurality of triangles, each level of detail having a geometric information about the position of the vertices in space and each level of detail having a connectivity information about the association between each triangle and the vertices that form the triangle, the memory further having a clustering information for each level of detail about how a plurality of sets of vertices in each level of detail are clustered and how each of the respective clusters correspond to a vertex in a level of detail with a next lower resolution;

a central processing unit (CPU);

a connectivity process, executed by the CPU, that identifies the connectivity information of a highest resolution level of detail;

a clustering process, executed by the CPU, that orders the clustering information for each level of detail, from the level of detail with the highest resolution to the level of detail with the lowest resolution; and a geometry process, executed by the CPU, that orders the geometric information of each level of detail from the level of detail with lowest resolution to the level of detail with highest resolution, where the geometric information of the lowest level of detail is compressed by representing each vertex of as the sum of a first prediction function and a first correction vector, the first predictor function being a function of zero or more first predictor parameters and zero or more vertices of the lowest resolution level of detail previously computed.

13. A system, as in claim 5, that further comprises a transmission process having the following steps:

first, transmitting the connectivity information of the highest resolution level of detail;

second, transmitting all of the clustering information in decreasing order of level of detail; and third, transmitting all of the geometric information in increasing order of level of detail.

14. A system, as in claim 5, further comprising a storage process having the following steps:

first, storing the connectivity information of the highest resolution level of detail;

second, storing all of the clustering information in decreasing order of level of detail; and third, storing all of the geometric information in increasing order of level of detail.

15. A system, as in claim 5, where the connectivity information is compressed.

16. A system, as in claim 15, where the connectivity information is compressed using any one or more of the following methods:

Rossignac and Taubin's Compression of Simple Geometric Models Using Spanning Trees, Rossignac and Taubin's Compression of Geometric Models Using Spanning Trees, Deering's Generalized Triangle Meshes, Hoppe's Progressive Meshes, and Popovic's Progressive Simplicial Complexes.

17. A system, as in claim 5, where the clustering information is compressed.

* * * * *